(12) United States Patent
Wharton et al.

(10) Patent No.: US 10,174,717 B2
(45) Date of Patent: Jan. 8, 2019

(54) THRUST REVERSER TRACK LOCK DETECTION

(71) Applicant: ROHR, INC., Chula Vista, CA (US)

(72) Inventors: Brett Wharton, Wolverhampton (GB); Bruce J. Adams, Wolverhampton (GB)

(73) Assignee: Rohr, Inc., Chula Vista, CA (US)

( * ) Notice: Subject to any disclaimer, the term of this patent is extended or adjusted under 35 U.S.C. 154(b) by 239 days.

(21) Appl. No.: 15/186,834

(22) Filed: Jun. 20, 2016

(65) Prior Publication Data

US 2017/0363041 A1    Dec. 21, 2017

(51) Int. Cl.
*F02K 1/76*    (2006.01)

(52) U.S. Cl.
CPC ........ *F02K 1/766* (2013.01); *F05D 2260/406* (2013.01)

(58) Field of Classification Search
CPC ...................................................... F02K 1/766
See application file for complete search history.

(56) References Cited

U.S. PATENT DOCUMENTS 7,216,581 B2 *   5/2007   McAuley ................ F02K 1/763
                                                        244/102 SL

* cited by examiner

*Primary Examiner* — F Daniel Lopez
(74) *Attorney, Agent, or Firm* — Snell & Wilmer L.L.P.

(57) ABSTRACT

A nacelle may include a track lock for a thrust reverser. The track lock may comprise a track lock blade which prevents the thrust reverser from accidentally deploying. The track lock blade may comprise a pressurized blade chamber which receives hydraulic fluid through a bore in a piston. In the event of failure of the track lock blade, the hydraulic fluid may leak from the track lock blade and be apparent upon visual inspection.

8 Claims, 4 Drawing Sheets

THRUST REVERSER TRACK LOCK DETECTION

FIELD

The disclosure generally relates to turbofan propulsion systems for aircraft. More particularly, the disclosure relates to track locks for use with a translating sleeve of a thrust reverser.

BACKGROUND

Turbine engine thrust reverser systems may include a translating sleeve. By deploying the translating sleeve, the thrust reverser may direct bypass air in a forward direction to create reverse thrust after landing. The translating sleeve slides aft to a deployed position and forward to a stowed position. A track lock system, also referred to as a track lock or a sleeve lock, prevents the translating sleeve from being accidentally deployed during flight. The thrust reverser typically includes two or three separate mechanisms to prevent unintentional deployment of the translating sleeve. The thrust reverser may include detection systems to determine whether the track locks are in working order. Current designs use a hydraulic track lock, in which the hydraulic fluid is contained within a piston housing. This keeps the hydraulic fluid away from the blade. The design incorporates a target sensor that monitors the blade length directly. The direct monitoring of the blade with the target sensor uses multiple additional components which complicates the design of the track lock.

SUMMARY

A track lock assembly for a thrust reverser may comprise a housing comprising a hydraulic chamber, and a piston located at least partially within the hydraulic chamber, wherein the piston comprises a bore extending through a head of the piston and a shaft of the piston.

In various embodiments, the track lock assembly may comprise a track lock blade. The track lock blade may comprise a blade chamber. The blade chamber may be fluidly coupled to the hydraulic chamber via the bore. The track lock assembly may comprise a return spring. The track lock blade may be configured to translate within a neck of the housing. The track lock blade may be coupled to the piston. A seal may circumscribe the shaft of the piston. The seal may be in contact with the track lock blade.

A thrust reverser may comprise a track beam; a translating sleeve coupled to the track beam, wherein the translating sleeve is configured to translate between a stowed position and a deployed position; and a track lock assembly coupled to the track beam, the track lock assembly comprising a track lock blade with a blade cavity.

In various embodiments, the track lock blade may be configured to contact the translating sleeve to prevent the translating sleeve from deploying. The track lock assembly may comprise a piston comprising a bore extending through a shaft of the piston and a head of the piston. The blade cavity and the bore may be fluidly coupled. The head of the piston may be located within a hydraulic chamber. The hydraulic chamber may be fluidly coupled to the blade cavity via the bore.

A track lock assembly may comprise a housing; a piston located within the housing; and a track lock blade located within the housing, wherein the track lock blade comprises a blade cavity.

In various embodiments, the piston may comprise a bore. The blade cavity may be fluidly coupled to the bore. A head of the piston may be located within a hydraulic chamber. The blade cavity may be fluidly coupled to the hydraulic chamber through the bore.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
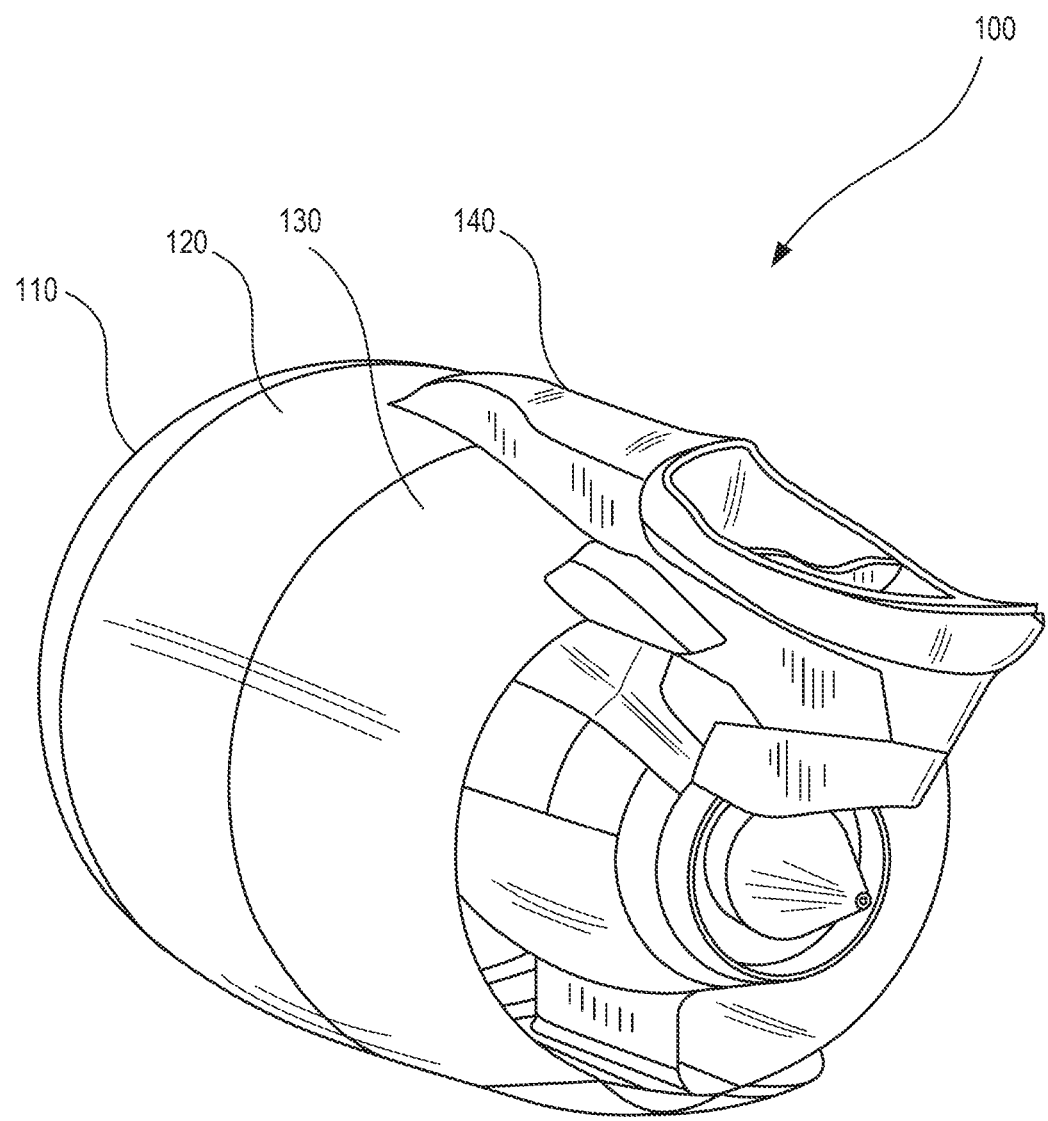
FIG. 1 illustrates a perspective view of a nacelle in accordance with various embodiments of the disclosure.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

In various embodiments, a thrust reverser may be configured to direct the flow of bypass air in a forward direction, causing reverse thrust. In this regard, a thrust reverser may comprise a translating sleeve which may be configured to translate forward and aft (e.g., to stow and deploy), in a known manner The translating sleeve may be configured to translate forward and aft adjacent to at least one of a hinge beam (i.e., the upper track beam) and a latch beam (i.e., the lower track beam). Accordingly, a hinge beam and a latch beam may be referred to herein collectively as track beams and/or a track beam. Various lock systems may be used to prevent the translating sleeve from aft translation.

A track lock may be located between a track beam and a translating sleeve. The track lock may comprise a track lock blade which contacts a v-blade or a portion of the track beam to prevent deployment of the translating sleeve. A hydraulically operated piston may be actuated to disengage the track lock blade. The piston may comprise a hollow shaft. Hydraulic fluid may be free to travel through the hollow shaft into a cavity of the track lock blade. In the event of fracture or cracking of the track lock blade, the hydraulic fluid may leak from the track lock blade and be apparent by a visual inspection of the track lock blade. Thus, the track lock described herein may add robustness to detectability of track lock with a position sensor: or the track lock described herein may be used in place of a position sensor, and the design of the track lock system may be simplified while maintaining failure detectability.

Referring to FIG. 1, a nacelle 100 for a gas turbine engine is illustrated according to various embodiments. The nacelle 100 may comprise an inlet 110, a fan cowl 120, and a thrust reverser 130. The nacelle 100 may be coupled, directly or indirectly, to a pylon 140, which may mount the nacelle 100 to an aircraft wing or aircraft body. The thrust reverser 130 may comprise a translating sleeve which translates relative to one or more track beams in order to deploy the thrust reverser 130.

The translating sleeve may translate forward (positive x-direction) and aft (negative x-direction) along a track beam. The translating sleeve may be mounted to the track beam. A slider-track assembly, known in the art, may be used to mount the translating sleeve to the track beam. The left translating sleeve may be configured to translate forward to a stowed position and aft to a deployed position.

A track lock assembly may prevent the translating sleeve from deploying unintentionally. The track lock may be coupled to the track beam via a mounting plate. However, in various embodiments the track lock may be coupled directly to the track beam without the use of a separate mounting plate. In various embodiments, mounting plate may be integrally formed with the track beam.

Figure 2:
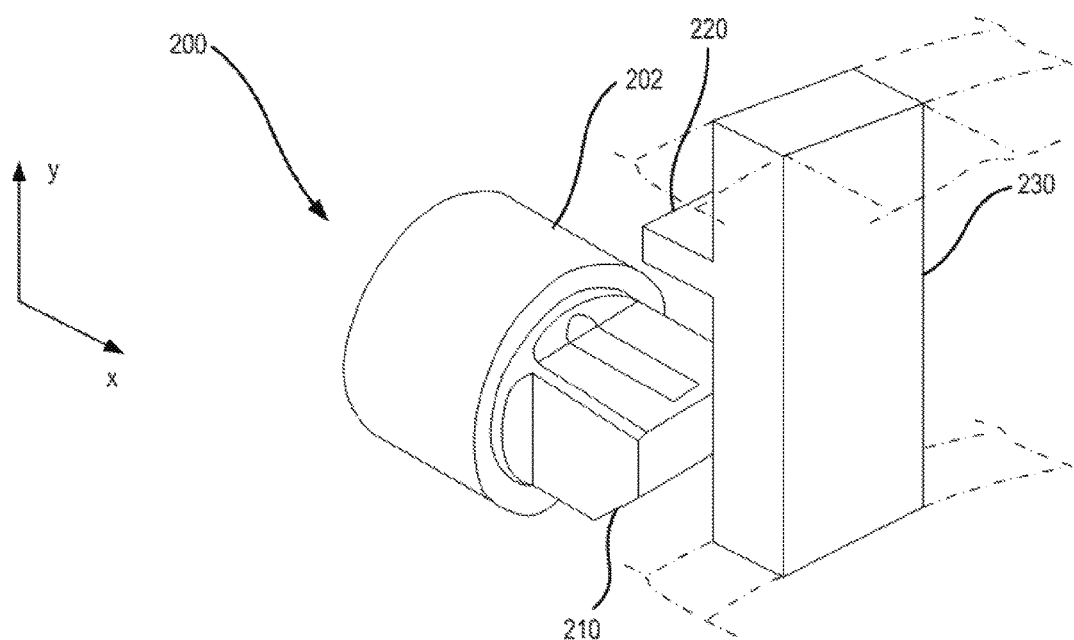
FIG. 2 illustrates a perspective view of a thrust reverser with a track lock assembly, in accordance with various embodiments of the disclosure.

Referring to FIG. 2 a perspective view of a track lock 200 in an engaged position is illustrated in accordance with various embodiments. X-y axes are shown for ease of illustration. The track lock 200 may comprise a track lock blade 210 which engages a stop 220 of the translating sleeve 230. If the translating sleeve 230 begins to deploy in the aft direction with the track lock 200 engaged, the track lock blade 210 will contact an engagement feature such as stop 220 on the translating sleeve 230. When the translating sleeve 230 deploys against the engaged track lock 200, the translating sleeve 230 will translate a short distance and the contact of the stop 220 on the track lock blade 210 tends to prevent further translating of the translating sleeve 230. The track lock blade 210 may withdraw within a housing 202 in order to disengage and allow the translating sleeve 230 to deploy.

Figure 3:
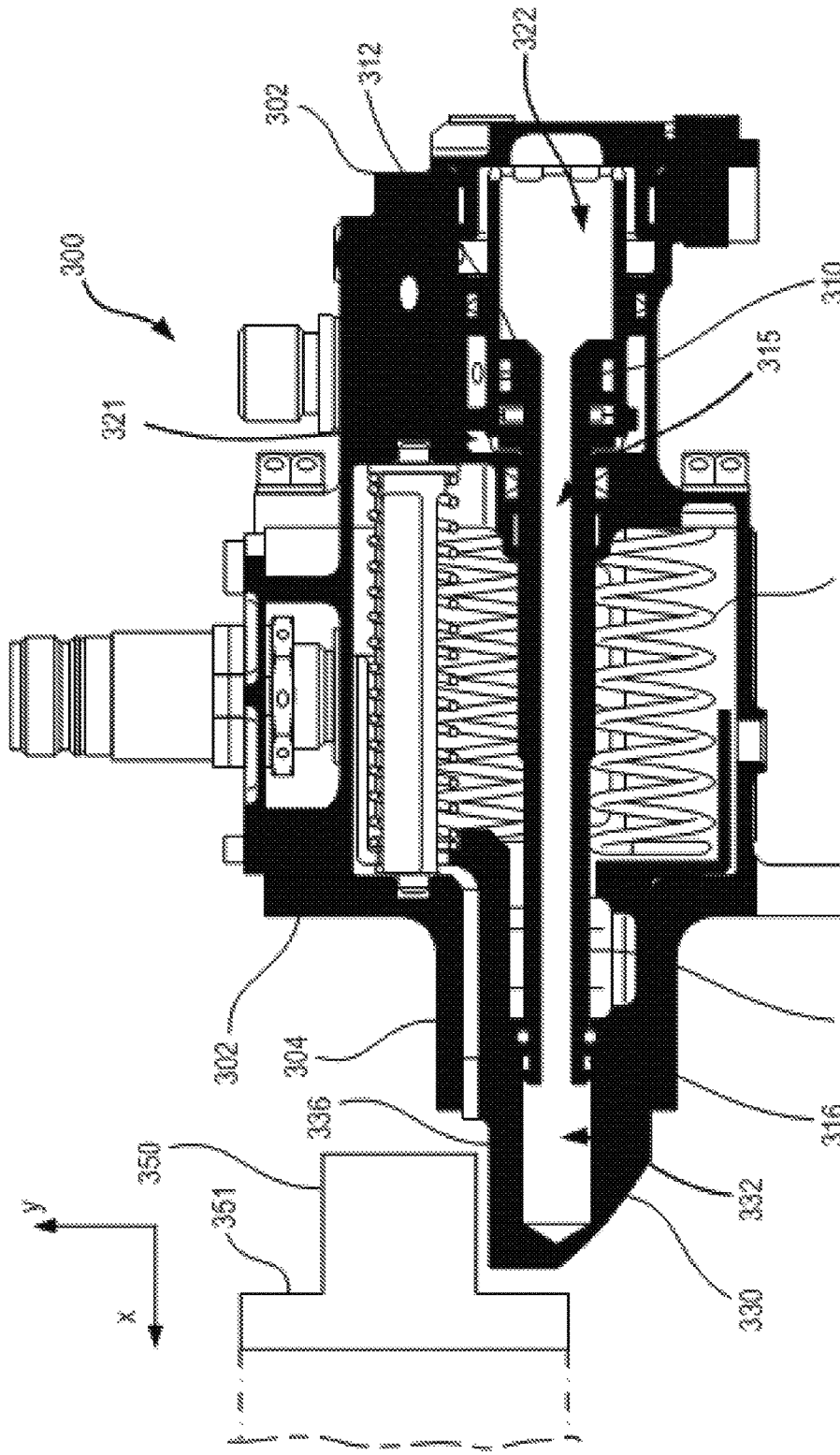
FIG. 3 illustrates a cross-section view of a track lock assembly, in accordance with various embodiments of the disclosure.

Referring to FIG. 3, a section view of a track lock 300 is illustrated according to various embodiments. The track lock 300 may comprise a housing 302 which generally encases the various components of the track lock 300. The track lock 300 may comprise a piston 310. The piston 310 may comprise a head 312 and a shaft 314. The piston 310 may comprise a bore 315 extending through the head 312 and the shaft 314. The head 312 may be located within a hydraulic chamber 322 within the housing 302 of the track lock 300. The head 312 may be configured to translate in the positive and negative x-direction within the hydraulic chamber 322.

The shaft 314 of the piston 310 may be coupled to a track lock blade 330. The track lock blade 330 may be configured to translate in the positive and negative x-direction within a neck 304 of the housing 302, such that in an engaged position, the track lock blade 330 extends outside of the housing 302. In the engaged position, the track lock blade 330 may comprise an engagement surface 336 configured to contact a stop 350 on a translating sleeve 351 to prevent the translating sleeve 351 from translating. The track lock blade 330 may comprise a blade cavity 332. The blade cavity 332 may be in in fluid communication with the hydraulic chamber 322 via the bore 315 of the piston 310. The piston 310 may comprise a seal 316 circumscribing the shaft 314 within the blade cavity 332. The seal 316 may contact the track lock blade 330 within the blade cavity 332 and prevent fluid from leaking between the shaft 314 and the track lock blade 330.

The shaft 314 of the piston 310 may extend through a return spring 340. One or more return springs 340 may be coupled to the track lock blade 330. The return spring 340 may also be coupled to a portion of the housing 302. The return spring 340 may bias the piston 310 in the positive x-direction to lock the track lock 300.

In order to unlock the track lock 300, the pressure in a supply chamber 321 may be increased. The pressure in the supply chamber 321 may be greater than the pressure in the hydraulic chamber 322, forcing the piston 310 to translate in the negative x-direction. In the unlocked, or disengaged, position, the track lock 300 may allow for a translating sleeve to translate in order to deploy a thrust reverser.

In order to re-engage the track lock 300, the pressure in the supply chamber 321 may be decreased. The supply chamber 321, the hydraulic chamber 322, the bore 315, and the blade cavity 332 may be equally pressurized. The return spring 340 and the pressure in the hydraulic chamber 322 may cause the piston 310 and the track lock blade 330 to translate in the positive x-direction in the direction of the track lock blade 330. The contact area between the hydraulic chamber 322 and the head 312 may be greater than the contact area between the supply chamber 321 and the head 312, resulting in a net force in the positive x-direction when the hydraulic chamber 322 and the supply chamber 321 are equally pressurized.

As previously described, the blade cavity 332 is pressurized due to its connection with the hydraulic chamber. Thus, in the event that the track lock blade 330 is cracked or separated from the track lock 300 completely, the pressure from the hydraulic chamber 322 may cause hydraulic fluid to leak out the track lock blade 330. Maintenance personnel may visually inspect the track lock 300 for leaking fluid. Thus, maintenance personnel may be able to detect failure of the track lock 300 by simply viewing the area around the track lock 300 without mechanically taking apart the track lock 300.

Figure 4:
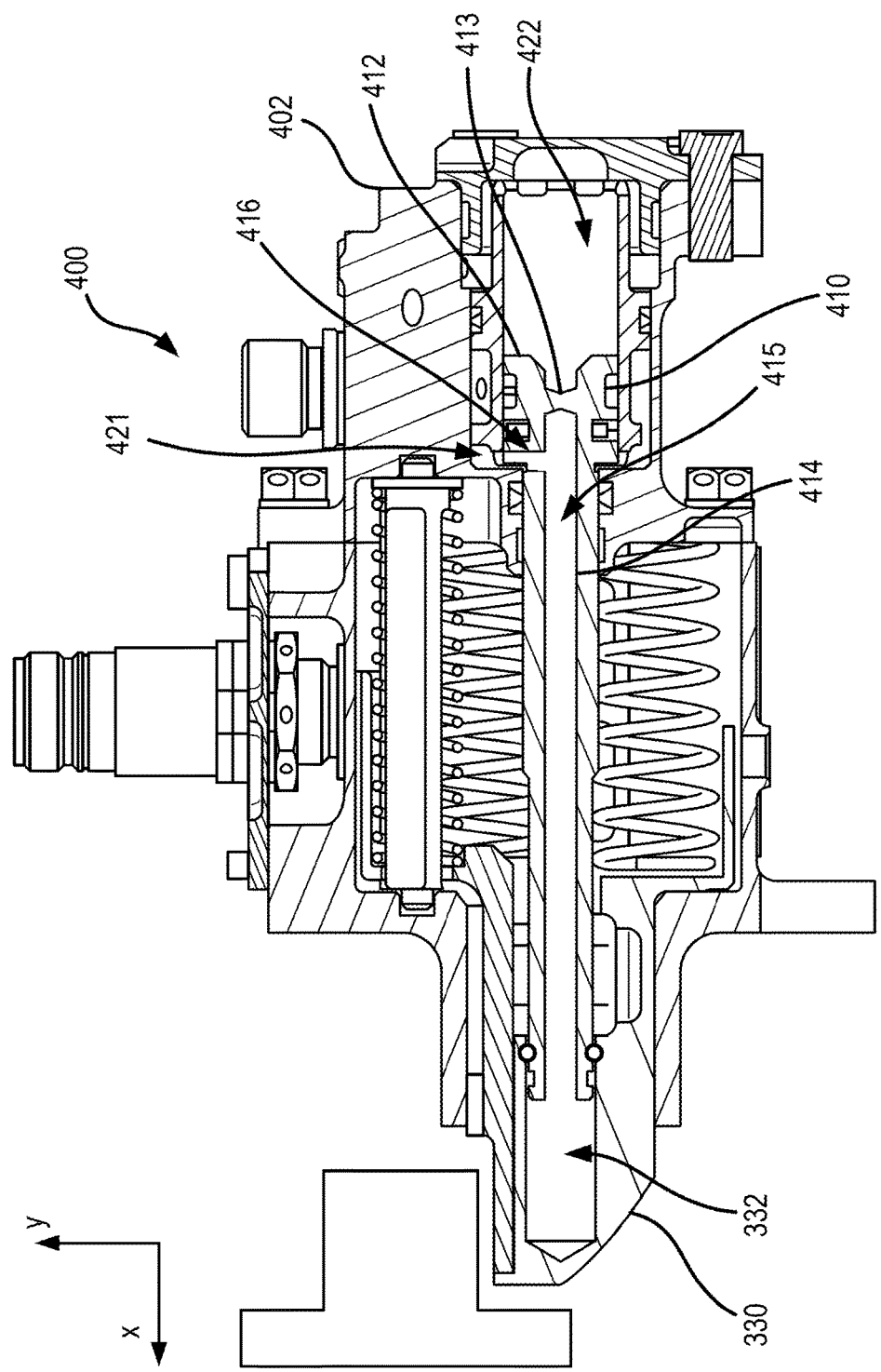
FIG. 4 illustrates a cross-section view of a track lock with a split hydraulic chamber in accordance with various embodiments of the disclosure.

Referring to FIG. 4, a track lock 400 with a split hydraulic chamber is illustrated according to various embodiments. The supply chamber 421 may be in fluid communication with the bore 415 through an aperture 416 in the shaft 414 of the piston 410, and thus also in fluid communication with the blade cavity 432. The bore 415 of the piston 410 may be fluidically isolated from the hydraulic chamber 422 by a center portion 413 of the head 412. To disengage the track lock 400, pressure in the supply chamber 421 may be increased (or pressure in the hydraulic chamber 422 may be decreased), thereby increasing the pressure in the bore 415 and the blade cavity 432, and forcing the piston 410 to translate in the negative x-direction. In the event that the track lock blade 430 is cracked or separated from the track lock 400 completely, the pressure from the supply chamber 421 may cause hydraulic fluid to leak out the track lock blade 430.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant arts) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A track lock assembly for a thrust reverser comprising:
a housing comprising a hydraulic chamber; and
a piston located at least partially within the hydraulic chamber, wherein the piston comprises a bore extending through a head of the piston and a shaft of the piston;
a track lock blade having a blade cavity and coupled to the shaft of the piston, wherein the blade cavity is fluidly coupled to the hydraulic chamber via the bore.

2. The track lock assembly of claim 1, further comprising a return spring coupled to a portion of the housing.

3. The track lock assembly of claim 1, wherein the track lock blade is configured to translate within a neck of the housing.

4. The track lock assembly of claim 1, further comprising a seal circumscribing the shaft of the piston.

5. The track lock assembly of claim 4, wherein the seal is in contact with a track lock blade.

6. A thrust reverser comprising:
a track beam;
a translating sleeve having a stop, the translating sleeve coupled to the track beam, wherein the translating sleeve is configured to translate between a stowed position and a deployed position; and
a track lock assembly coupled to the track beam, the track lock assembly comprising a track lock blade with a blade cavity, a piston coupled to the track lock blade comprising a bore extending through a shaft of the piston and a head of the piston;
a hydraulic chamber containing the head of the piston and fluidly coupled to the blade cavity through the bore.

7. The thrust reverser of claim 6, wherein the track lock blade is configured to contact the stop of the translating sleeve to prevent the translating sleeve from further deploying.

8. A track lock assembly comprising:
a housing;
a piston having a head and a shaft located within the housing; and
a track lock blade coupled to the shaft of the piston and located within the housing, wherein the track lock blade comprises a blade cavity configured to be filled with fluid, wherein the fluid is configured to be detectible outside the housing upon a crack forming in the track lock blade.

* * * * *